UNITED STATES PATENT OFFICE.

CHARLES E. SWETT, OF BROOKLINE, MASSACHUSETTS, ASSIGNOR TO ARTHUR D. LITTLE, INCORPORATED, OF CAMBRIDGE, MASSACHUSETTS, A CORPORATION OF MASSACHUSETTS.

METHOD OF FORMING SHAPED ARTICLES FROM PRECIPITATED SKIN-LIKE COMPOUNDS.

1,348,459.  Specification of Letters Patent.  Patented Aug. 3, 1920.

No Drawing.  Application filed March 27, 1919. Serial No. 285,621.

*To all whom it may concern:*

Be it known that I, CHARLES E. SWETT, a citizen of the United States, residing at Brookline, in the county of Suffolk and State of Massachusetts, have invented certain new and useful Improvements in Methods of Forming Shaped Articles from Precipitated Skin-Like Compounds, of which the following is a specification.

The present invention relates to a method of forming articles of predetermined shapes from precipitated skin-like compounds and more particularly to a method of preparing such articles from an algin compound, insoluble in water, for use as sausage casing, capsules, gas tubes, gasolene-proof tubes, containers for non-aqueous fluids, etc.

From certain marine algæ, notably from laminaria, there may be obtained material allied to pectic acid and known as algin or alginic acid.

This material is best dissolved from the sea weed in the form of alkaline alginates by soluble alkaline carbonates.

Otherwise, it may be obtained by macerating the sea weed with dilute acid to break up the lime compound, in which form the algin seems to exist in the plant, followed by drainage and washing. The acid-extracted and washed material may then be treated with caustic alkalis, including ammonia, and as so treated results in a good solution of the material desired.

The alkaline alginate, however obtained, may be precipitated with acids to form alginic acid or the alkaline solution may be treated with any soluble salt of a heavy metal, except the salts of magnesium. There result by double decomposition insoluble salts of alginic acid. For example, calcium chlorid yields calcium alginate, aluminum sulfate yields aluminum alginate, etc.

The treatment of sea weed, in the manner above referred to, for the purpose of producing insoluble metal alginates is well known and forms no part of the present invention.

The present invention consists broadly in wetting a porous support with one of the solutions which when brought together produce the membranous precipitate and then applying to the film of this solution which is retained on the support the second solution, whereby the resulting precipitate is formed in the shape of the porous support.

More specifically, my invention consists in wetting the porous support with the precipitating agent and then applying thereto the solution containing the algin compound.

In carrying out the invention, the following procedure has been found quite satisfactory, but may be somewhat varied within the contemplation of those skilled in the art without departing from the spirit and scope of the invention.

A form of the desired shape over which the molding is to be done is made of porous material as, for example, porous wood, plaster of Paris or the like.

In the particular instance and for the specific purpose of forming articles from algin compounds, the porous form is first dipped in a water solution of the soluble salt the base of which is later to act on the alkaline alginate by double decomposition. The form while wet with the desired solution or, alternatively, in any state of dryness after wetting with the desired solution, is then immersed in the alkaline alginate solution. After removal from the alginate solution it may, if desired, be plunged into the saline solution previously described or any other saline solution acting on the soluble alkaline alginate to cause precipitation of an insoluble algin compound. While the article formed as above is still supported on the first described porous form it may be washed with water to remove soluble salts, after which the precipitated algin article may be stripped from the support with ease.

The purpose of using a porous form or support is to secure the adherence of enough of the precipitant to insure surface precipitation at once and to hold a certain reserve that will diffuse subsequently from the porous form or support into the alginate layer which has been superficially precipitated or set by first contact.

While I have described the operation with the use of a soluble salt, it may also be carried out with acid, with the result that the articles formed will be composed of alginic acid. To precipitate alginic acid from the alkali alginate an acid stronger than alginic, for instance hydrochloric acid, is used in the same manner as the salts of the heavy metals, as above described.

While I have described my invention in connection with the use of alkaline alginates and suitable precipitants, I wish it to be understood that it is generally applicable to operations in which a membranous substance may be precipitated by the reaction between two liquid or viscous bodies.

In the claims, "algin compound" is intended of course to include alginic acid.

I claim:

1. The method of making predetermined shapes of skin-like bodies, which consists in first wetting a porous form with a precipitating agent adapted to react with a solution containing a precipitable membraniferous substance to produce a skin-like body, then applying to the wetted form the said solution and finally removing the skin-like body.

2. The method of making predetermined shapes of insoluble skin-like bodies, which consists in first wetting a porous form with a precipitating agent adapted to react with a solution containing a precipitable membraniferous substance to produce an insoluble skin-like body, then applying to the wetted form the said solution and finally removing the skin-like body.

3. The method of making predetermined shapes of algin compounds, which consists in first wetting a porous form with a solution adapted to precipitate the algin compound from an alginate solution, then applying to the wetted form a solution of the alginate and finally removing from the form the algin compound formed.

4. The method of making predetermined shapes of insoluble algin compounds which consists in first wetting a porous form with an aqueous solution adapted to precipitate the algin compound from an alkaline solution of the alginate, then applying to the wetted form a solution of the alkaline alginate and finally removing from the form the algin compound formed.

5. The method of making predetermined shapes of algin componds, which consists in first wetting a porous form with a solution adapted to precipitate the algin compound from an alginate solution, then applying to the wetted form a solution of the alginate, applying again the precipitating solution and finally removing the algin compound formed.

In testimony whereof I affix my signature.

CHAS. E. SWETT.